(No Model.) 4 Sheets—Sheet 1.

D. W. HITCHCOCK.
COFFEE OR PEANUT ROASTER.

No. 337,403. Patented Mar. 9, 1886.

WITNESSES
M. E. Fowler
Edward G. Diggers

INVENTOR
Daniel W. Hitchcock
by C. A. Snow & Co.
Attorneys

N. PETERS, Photo-Lithographer, Washington, D. C.

(No Model.) 4 Sheets—Sheet 2.
D. W. HITCHCOCK.
COFFEE OR PEANUT ROASTER.
No. 337,403. Patented Mar. 9, 1886.
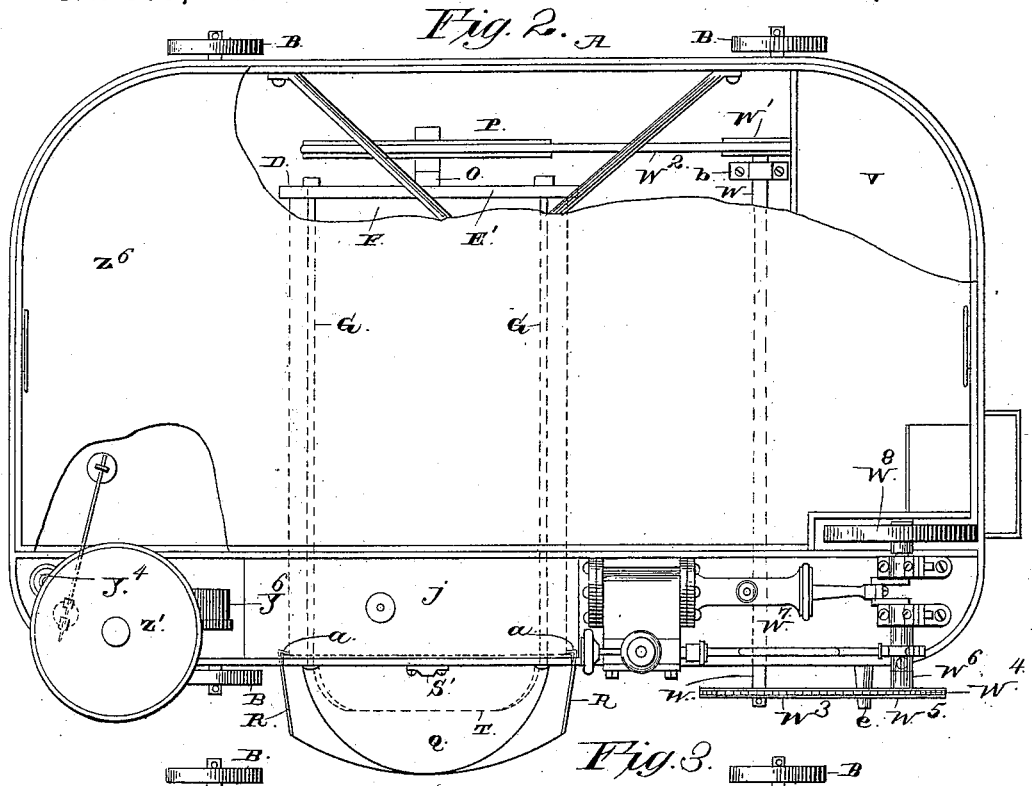
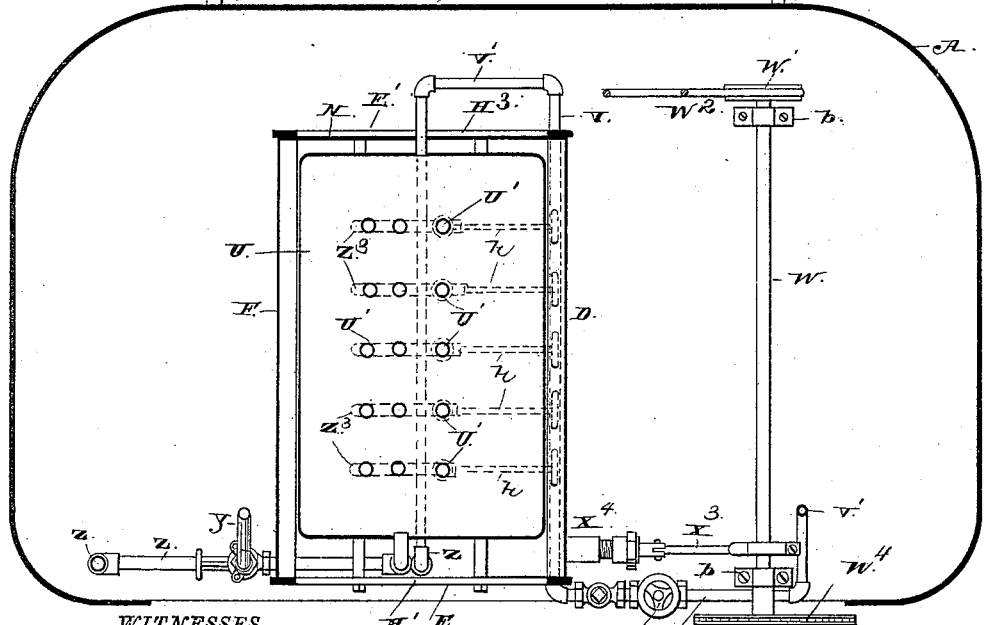
WITNESSES
M. E. Fowler
E. G. Siggers
INVENTOR
Daniel W. Hitchcock
by C. A. Snow & Co.
Attorneys (No Model.)   D. W. HITCHCOCK.   4 Sheets—Sheet 3.
COFFEE OR PEANUT ROASTER.

No. 337,403.   Patented Mar. 9, 1886.

WITNESSES
M. E. Fowler
E. G. Siggers

INVENTOR
Daniel W. Hitchcock
By C. A. Snow & Co.
Attorneys

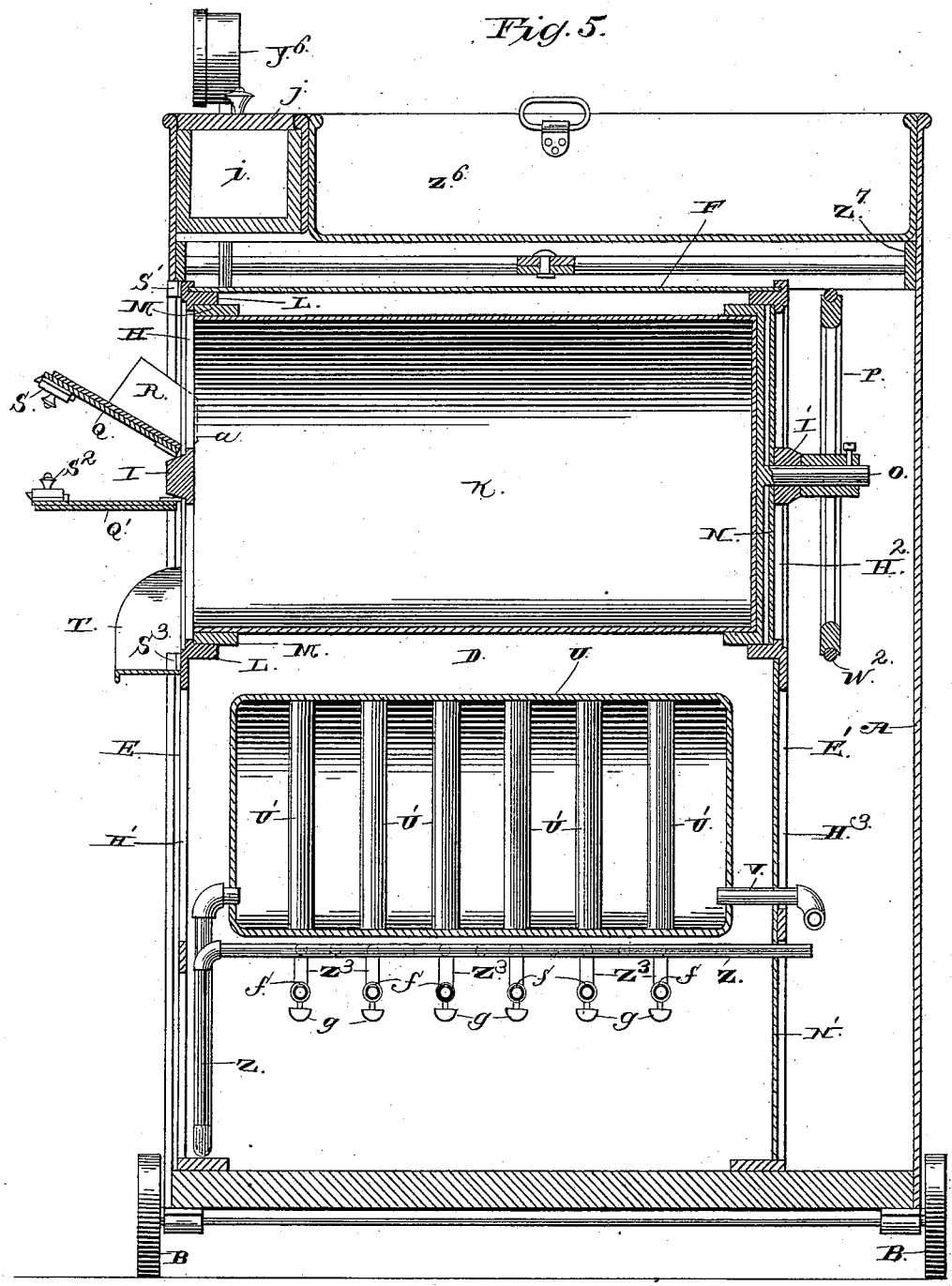

UNITED STATES PATENT OFFICE.

DANIEL WILLIAM HITCHCOCK, OF OSKALOOSA, IOWA.

COFFEE OR PEANUT ROASTER.

SPECIFICATION forming part of Letters Patent No. 337,403, dated March 9, 1886.

Application filed June 25, 1885. Serial No. 169,756. (No model.)

*To all whom it may concern:*

Be it known that I, DANIEL WILLIAM HITCHCOCK, a citizen of the United States, residing at Oskaloosa, in the county of Mahaska and State of Iowa, have invented a new and useful Improvement in Coffee or Peanut Roasters, of which the following is a specification, reference being had to the accompanying drawings.

This invention relates to coffee or peanut roasters, and to that class of the same in which a revolving cylinder is employed to contain the material to be treated.

The object of the invention is to provide an improved machine of this character which shall be practical in every respect, and which will serve to roast the coffee or peanuts with a degree of rapidity and excellence not heretofore attained.

A further object of the invention is to provide a machine in which the boiler and the cylinder will be heated and the engine operated to transmit motion to the cylinder by the employment of only one fire.

With these ends in view the said invention consists in the peculiar construction, combination, and arrangement of parts, as will be hereinafter set forth, and particularly pointed out in the claims.

Figure 1:
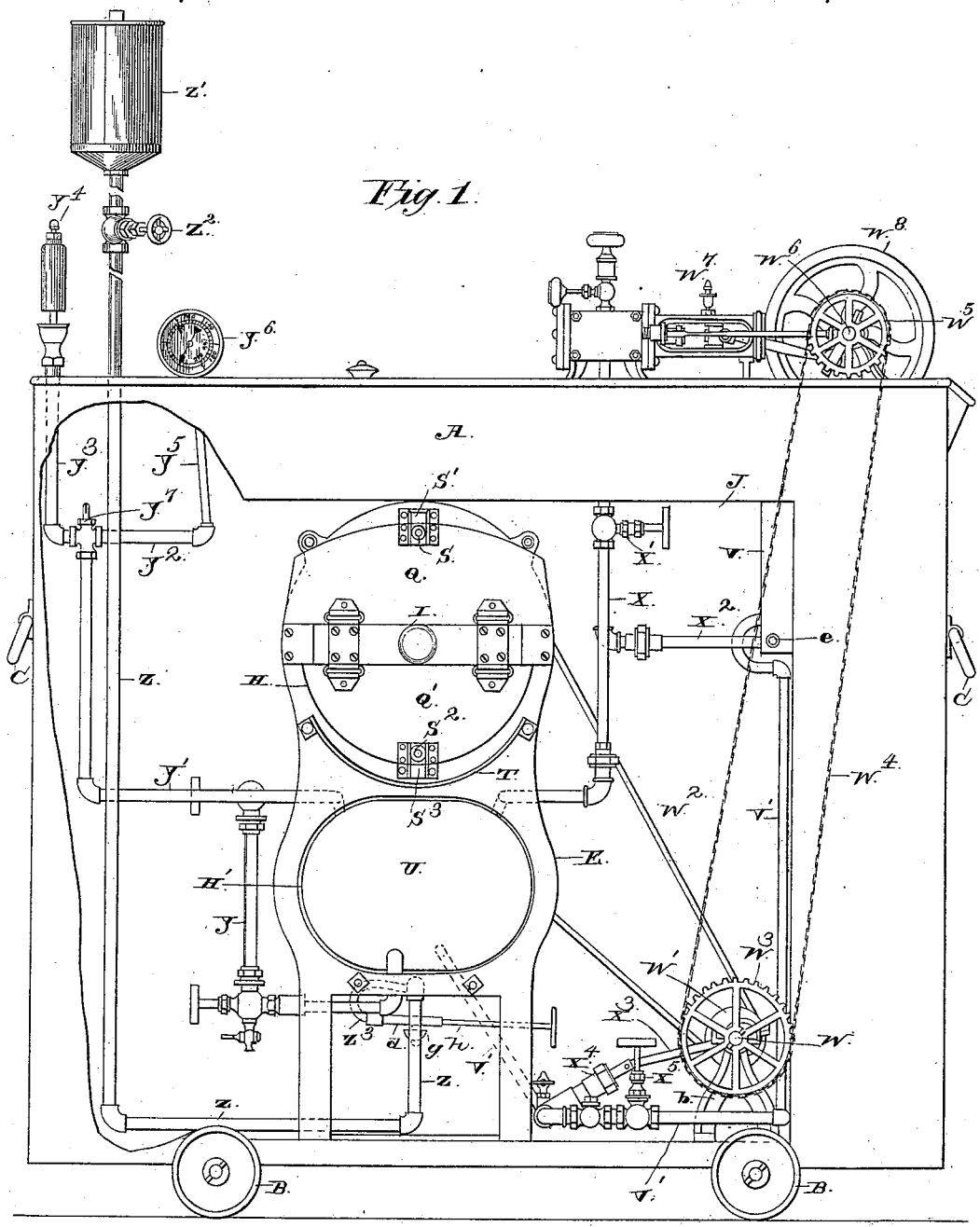
Figure 4:
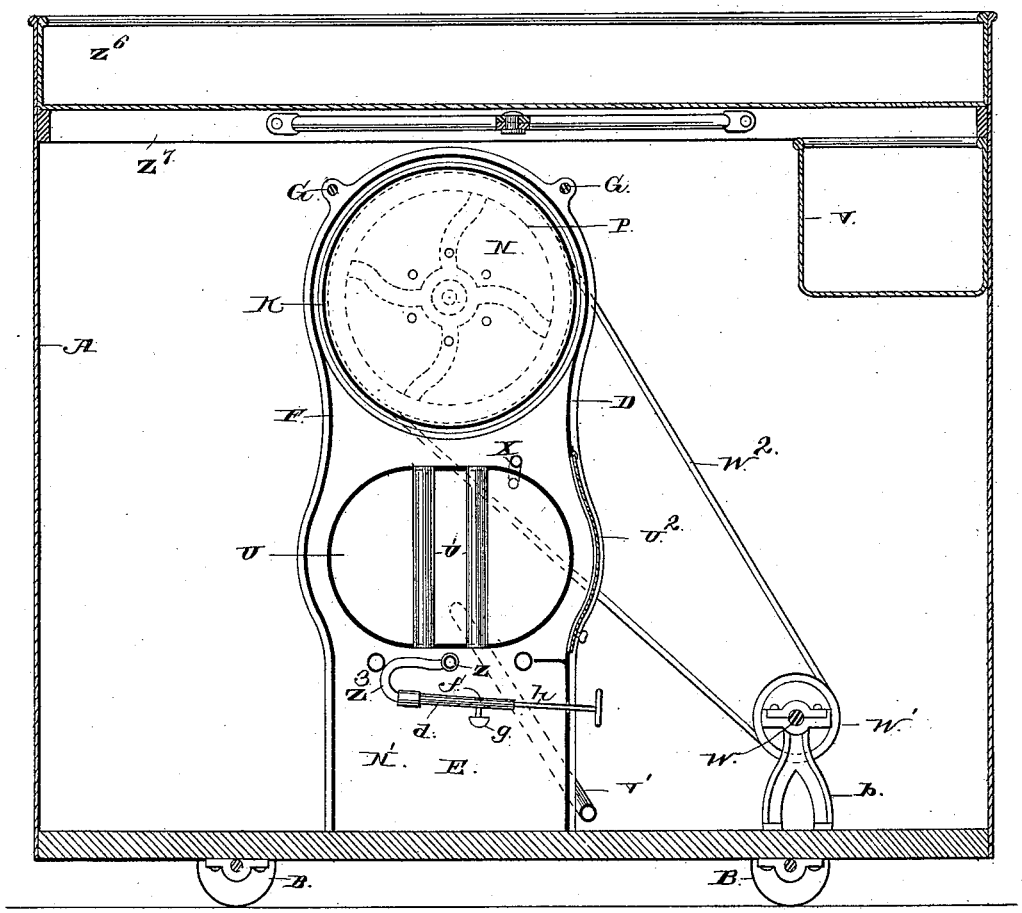

In the accompanying drawings, Figure 1 is a front elevation of my improved machine. Fig. 2 is a plan view of the same. Fig. 3 is a vertical longitudinal section of the same, taken transversely through the cylinder and boiler. Fig. 4 is a vertical transverse section on the line $x$ $x$, Fig. 2. Fig. 5 is a horizontal section on the line $y$ $y$, Fig. 1.

Like letters are used to indicate corresponding parts in the several figures.

Referring to the drawings, A designates the outer casing of the machine, which is preferably constructed of sheet metal, and which incloses the various working parts. This casing, which forms a frame-work or support for the interior mechanism, is preferably mounted on small wheels or rollers B, by means of which the machine may be readily transported from place to place. Handles C are attached to the exterior of the casing for convenience in handling the machine. Within the interior of the casing, and mounted on the bottom thereof, is an inclosing-frame, D, which extends in a vertical line, and comprises cast-iron heads or ends E E', connected together at their sides and top by a sheet-iron plate, F. Rods G (two or more) connect the heads E E' outside of the plate F and form a more secure connection between the parts. The ends or heads E E' are provided with openings H H' $H^2$ $H^3$ at the front and rear, respectively. Cross-bars I I' extend across the openings H $H^2$ of the heads E E', at or about the center of the openings. The front head, E, comes on a line with the front end of the casing A, the latter being cut out at this end, or provided with an opening, J, to allow access to the interior of the casing.

K designates the revolving cylinder in which the material to be treated is placed, constructed of sheet-iron, the rear of the cylinder being closed, while the front end is open and comes on a line with the opening H of the head E. The said head E is provided with an inwardly-extending annular flange or ring, L, around the opening H, the front open end of the cylinder being re-enforced by an annular band, M, and resting on the flange or ring L. Sheet-iron plates N N' are secured to the head or end E' and close the openings $H^2$ $H^3$. The closed rear end of the cylinder K is provided with a short shaft, O, which passes through the cross-bar I' and plate N, and is provided beyond the head E' with a band-wheel P. The flange or ring L forms a bearing for the front open end of the cylinder, while the short shaft O will provide a similar bearing at the rear end thereof, this arrangement causing the cylinder to work with greater ease and less friction than heretofore. It will also be observed that a space is left between the cylinder and the plate F, which space forms a chamber to retain the hot air and allow it to circulate freely around the cylinder as the latter is revolved, thereby effecting a more thorough heating of the cylinder at all parts. Furthermore, the cylinder cannot work out of place, but will always turn in a true line, and will be held from moving laterally.

Q designates a door hinged to the upper edge of the cross-bar I, and closing part of the opening H above the latter. Side flanges, R, are provided on the door Q, to work over the head E, and are formed with an inwardly-turned end, $a$, which forms a catch to engage with or abut against the inner side of the head E, and thus limit the downward movement of the door. A spring-actuated locking-bolt, S, is provided at the upper edge of the door Q, to engage with a keeper, S', secured to the head E, whereby said door will be locked in its closed position, and may be swung down at any moment by releasing the locking-bolt.

Q' designates a door hinged to the under side of the cross-bar I, and closing the lower half of the opening H. This door is also provided with a locking-bolt, $S^2$, to engage the keeper $S^3$ on the head E. As will be understood, the lower door, Q', swings upward to allow the withdrawal of such of the peanuts as have been sufficiently roasted, while the upper door, Q, swings downward and provides for the introduction of the fresh material to be treated. A semicircular guard, T, is secured to the front face of the head E, below the opening H, and is adapted to catch the grains of coffee which may be accidentally dropped when the machine is in operation.

U designates the boiler, oval in shape, and containing the water for generating the steam which is to be supplied to the engine. This boiler is provided with a series of vertical flues, U', preferably sixteen in number, said flues being open at each end, the open ends of the flues being located at the top and bottom of the boiler. Flues U' have their upper ends opening at different points along the length of a cylinder, K, so that the flame from a series of burners, hereinafter described, will be caused to ascend through the flues, and not only heat the water in the boiler, but also heat the cylinder as the latter is revolved. The boiler is located below the cylinder, and registers with the openings H' and $H^3$, provided in the ends E E'. Part of the plate F is cut out and hinged to provide a door, $U^2$, by means of which the said door may be swung upward to allow access to the burners and adjacent parts of the interior mechanism.

V designates a water box or reservoir supported by hangers at one side of and within the casing A. A spout is provided in the casing to communicate with the water-box, so that the latter may be supplied with water through the spout. A pipe, V', connects with the bottom of the reservoir V, and extends downward to the bottom of the casing A and along said bottom to the rear end of the casing, at which point it extends upward and communicates with the rear end of the boiler, to supply it with water as desired.

W designates a shaft mounted in supporting-standards $b$, projecting upward from the bottom of the casing A. One end of the shaft is provided with a pulley, W', which connects by a band or strap, $W^2$, with the band-wheel P on the shaft O of the cylinder. The other end of the shaft W is provided with a sprocket-wheel, $W^3$, which connects by a chain, $W^4$, with a corresponding sprocket-wheel, $W^5$, mounted on the outer end of the driving-shaft $W^6$ of the steam-engine $W^7$, the latter being of the usual construction, as will be seen, and therefore does not require a detailed description thereof. On the other end of the driving-shaft $W^6$ is mounted a band-wheel, $W^8$, which may connect by a suitable band (not shown) with a coffee-grinder, as will be readily understood. The engine $W^7$ is preferably mounted on the top of the casing A and at one corner thereof, and a steam-chest is supplied by a pipe, X, with steam from the boiler U, the said pipe X extending along and over the top of the boiler, and communicating with the same at its rear end. The valve X' is located at a suitable point on the pipe X to control the passage of steam. An exhaust-pipe, $X^2$, carries the exhaust-steam from the engine and connects with the water-reservoir V, the said pipe exhausting through the spout or outlet $e$. Steam being supplied to the engine through the pipe X, the engine is operated, causing the driving-shaft $W^6$ to be revolved, this action effecting the rotation of the shaft W by means of the chain $W^4$ and the sprocket-wheels $W^3$ $W^5$. As the shaft W turns, the roasting-cylinder is caused to revolve, thereby effecting a continual turning of the contents of the cylinder, so as to prevent burning. At the same time, as the shaft W transmits motion to the cylinder a piston, $X^3$, of a pump, $X^4$, which is connected by an eccentric on the shaft W, is operated thereby to force the water passing through the pipe V' into the boiler. It will be understood that by this connection the rotation of the shaft W causes the cylinder K to revolve, and also effects the operation of the pump to feed the boiler with a proper supply of water. A valve, $X^5$, is located in the pipe V', forward of the point of connection of the pump $X^4$, so as to shut off the supply of water as desired.

Y designates the water-gage, connecting, respectively, with the steam and water spaces of the boiler U, this gage being located outside of the frame D and extending in an inclined line, and serving to show the true depth of water in the boiler in a manner well known.

Y' designates a pipe connecting with the steam-space of the boiler and extending upward within the casing A, and provided at its upper end with a transverse pipe, $Y^2$, one end of which is provided with a branch pipe, $Y^3$, extending up through the casing, and having at its upper end the usual whistle, $Y^4$. The other end of the transverse pipe $Y^2$ has a branch, $Y^5$, which carries at its upper end, outside of the casing A, a steam-pressure gage, $Y^6$. At the point of connection of the pipe Y' with the pipe $Y^2$ is located a safety-valve, $Y^7$, of the usual construction.

Z designates a vertical pipe extending from the point above the casing A, where it is provided with a reservoir, Z', for gasoline or other burning-fluid, down through the casing of the bottom thereof, along the bottom beneath the boiler U, and then longitudinally below the boiler, as will be seen. This pipe Z is provided with a valve, $Z^2$, by means of which the supply of gasoline may be cut off as desired. At suitable points along the length of the pipe Z, below the boiler U, are connected a series of curved branch pipes, $Z^3 Z^3$, the latter having straight portions $d$, extending transversely of the pipe Z, and below the same, and provided with holes $f$. Deflecting cones or cups $g$ are attached to each of the pipes $Z^3$ $Z^3$, below the openings $f$, so as to deflect the flame as it issues from the openings in an upward direction. Since the point at which the curved pipe $Z^3$ is arranged corresponds with one of the flues of the boiler, it will be understood that the flame will be caused to ascend through the flues, heat the water in the boiler, and act upon the cylinder as it is revolved. Shafts $h$ are threaded at one end to work through the threaded open ends of the pipes $Z^3$, and are provided with small hand-wheels by means of which the shafts may be turned to decrease the flame, for a purpose well known.

When the machine is used as a peanut-roaster, the peanuts as they are withdrawn from the cylinder may be placed in a large pan, $Z^6$, which is supported on the band $Z^7$, secured on the interior of the casing A. Diagonal brace-rods extend across the top of the casing and connect the sides thereof. At the front side of the casing is provided a compartment, $i$, closed by a cover, $j$, said compartment being adapted to receive an oil-cup, or such implements as may be found necessary to use with the machine and keep it in proper order.

The operation of my invention will be readily understood from the foregoing description, taken in connection with the annexed drawings. A sufficient quantity of water should always be retained in the boiler to generate steam to start the engine. The cylinder K is supplied with either coffee or peanuts through the door Q'. Gasoline is supplied to the reservoir Z' through its nozzle, and by operating the valve $Z^2$ the fluid is caused to be supplied to the burners. The latter are then ignited, the flame ascending through the flues and acting upon the cylinder as the latter is revolved. Steam is soon generated in the boiler, and passes upward through the pipe X to the engine, the latter being worked in the usual manner. The operation of the engine causes the rotation of the cylinder K and the working of the pump $X^4$ at the same time, the connection between the pump and the boiler being cut off as desired. The operator can tell by examining the water-gage the depth of water in the boiler, and make the necessary connection between the pump and the boiler when necessary to do so. When employed as a peanut-roaster, the nuts at the top of the cylinder may be withdrawn through the door Q and deposited in the pan $Z^6$, located across the top of the casing.

The particular point of advantage which I claim for my machine over others of this class resides in the fact that the heat from the burners alone is sufficient to roast the coffee or peanuts, heat the water in the boiler, and generate steam for the engine, for the purpose of keeping the cylinder in motion and supplying the boiler with water. It will thus be seen that the several parts co-operate with each other to produce a machine that will be perfect in all its essential parts, working with admirable ease and wonderful rapidity.

The parts are so arranged that they cannot get out of order, and the several connections are such as to avoid any jarring to the machinery.

The peculiar construction of the frame B around the cylinder and boiler provides a hot-air space or chamber in which the cylinder moves. By this arrangement the heat strikes at all points of the cylinder, which, in connection with the longitudinal arrangement of the burners, as before described, causes the roasting of the coffee or peanuts to be effected with a degree of excellence which it has been long desired to obtain.

The peculiar oval-shape form of the boiler enables me to place it near to the cylinder, and at the same time have more heating-surface under and adjacent to said cylinder than if it were a round one.

It will be understood that by opening the lower door the roasted nuts will run out of the cylinder without stopping the engine or otherwise disturbing the action of the machine.

In order to define the nature, scope, and advantages of the present invention, I would have it understood that it is not new to combine with a roasting-cylinder an engine to rotate or keep the latter in motion, a boiler to supply steam to the engine, and heating devices for heating both the cylinder and boiler; but in this arrangement, prior to my invention, a pair of roasting-cylinders have been arranged below and on each side of the boiler, so as to leave a vertical passage between the cylinders, a lamp or other heating device being located under the cylinders, so as to throw the heat up the passage. My invention differs from this in that I locate the boiler under the roasting-cylinder and the heating devices below the boiler, whereby the boiler is directly heated, and at the same time the hot air and flame pass up to act upon the roasting-cylinder.

Having described my invention, I claim—

1. In a roaster for coffee, peanuts, and the like, the roasting-cylinder, in combination with the boiler located beneath the cylinder, the heating devices arranged beneath the boiler, so as to heat the cylinder at the same time, the engine supplied with steam from the boiler, and connecting mechanism between the engine and cylinder, as set forth.

2. The roasting-cylinder, in combination with a boiler located beneath the same, the heating devices arranged and supported under the boiler, the engine supplied with steam from the latter, a pump, and connecting mechanism between the engine, pump, and cylinder, as and for the purpose set forth.

3. The roasting-cylinder, in combination with the cylindrical boiler located beneath the same and made oval in cross-section, and the heating devices arranged and supported under the boiler, for the purpose set forth.

4. The outer casing or frame-work, A, in combination with the inclosing-frame D, located within the casing, and the roasting-cylinder and boiler, supported one above the other by means of the frame D, as and for the purpose set forth.

5. The outer casing, A, in combination with the frame D, located within the casing, the roasting-cylinder and boiler, supported one above the other by the frame D, the heating devices arranged under the boiler, the horizontal shaft W, mounted on the bottom of the casing A, and the engine connecting with the shaft W, said engine being supplied with steam from the boiler, and connecting devices between the shaft W and the roasting-cylinder, as set forth.

6. The casing A, in combination with the frame D, located within the same, the roasting-cylinder and boiler, supported one above the other by the frame D, the burners arranged under the boiler, the vertical pipe Z and reservoir Z' for supplying the burners, the horizontal shaft W, mounted on the bottom of the casing A and connecting with the roasting-cylinder, a pump having the piston actuated by the shaft W, the water-reservoir V, supported within the casing, the pipe V', connecting the boiler and reservoir and communicating with the cylinder of the pump, and the engine supported on the top of casing A, supplied with steam from the boiler, and having a suitable connection with the shaft W, as set forth.

7. The roasting-cylinder, in combination with the boiler located beneath the same and provided with a series of vertical flues, and the heating devices arranged under the boiler, whereby the flame and heat from said heating devices will be caused to ascend through the flues, heat the water in the boiler, and also act upon the roasting-cylinder, as set forth.

8. The roasting-cylinder, in combination with the boiler located beneath the same, vertical flues provided in the boiler, and an inclosing-frame around the cylinder and boiler, forming a hot-air space or chamber, for the purpose set forth.

9. The roasting-cylinder, in combination with the supporting-frame, the bar extending across the open end of the cylinder, the lower door, Q', and the upper door, Q, provided with side flanges to work over the supporting-frame and catch against the same when the limit of movement for the door is reached, as set forth.

10. The roasting-cylinder, in combination with the boiler located beneath the same, and the inclosing-frame D, comprising the heads or ends E E', and the plate F, connected to the ends and extending over the top of the cylinder and the sides of the boiler, so as to provide a hot-air chamber or space, as set forth.

11. In a roasting-machine, the outer casing, A, in combination with the inclosing-frame D, comprising heads or ends E E', and the connecting-plate F, the openings H H², provided in the heads or ends, cross-bars I I', extending across the top openings, H H², of heads E E', the annular flange or rim L, provided around the opening H, to support the open end of the roasting-cylinder and working in the cross-bar I, and a band-wheel, P, mounted on the shaft, as set forth.

12. The roasting-cylinder, in combination with the boiler arranged under the same and provided with a series of vertical flues, a series of burners located beneath the boiler and coming on a line with a number of the flues, and a suitable reservoir to contain the burning-fluid, for the purpose set forth.

In testimony that I claim the foregoing as my own I have hereto affixed my signature in presence of two witnesses.

DANIEL WILLIAM HITCHCOCK.

Witnesses:
W. A. LINDLY,
H. W. SEEVERS.